(12) United States Patent
Brown (10) Patent No.: US 10,070,571 B1
(45) Date of Patent: Sep. 11, 2018

(54) TOOL ATTACHMENT FOR WEED AND DEBRIS REMOVAL

(71) Applicant: RLR Enterprises, LLC, Rochester Hills, MI (US)

(72) Inventor: Rodney L. Brown, Rochester Hills, MI (US)

(73) Assignee: RLR Enterprises, LLC, Rochester Hills, MI (US)

( * ) Notice: Subject to any disclaimer, the term of this patent is extended or adjusted under 35 U.S.C. 154(b) by 0 days.

(21) Appl. No.: 14/972,773

(22) Filed: Dec. 17, 2015

(51) Int. Cl.
*A01B 1/16* (2006.01)

(52) U.S. Cl.
CPC ...................................... *A01B 1/16* (2013.01)

(58) Field of Classification Search
CPC ................ A01B 1/08; A01B 1/16; A01B 1/14
USPC ................ 172/13, 381; D8/DIG. 7
See application file for complete search history.

(56) References Cited

U.S. PATENT DOCUMENTS

| | | | | |
|---|---|---|---|---|
| 171,303 A * | 12/1875 | Moore | ...................... | A01B 1/16 30/165 |
| 214,923 A * | 4/1879 | Justi | .......................... | A61C 3/00 433/141 |
| 237,056 A * | 1/1881 | Sherwood | ................ | A01B 1/14 172/378 |
| 423,640 A * | 3/1890 | Stiles | ....................... | A01B 1/14 15/142 |
| 656,300 A * | 8/1900 | Perry | ....................... | A61C 3/00 433/141 |
| 1,066,871 A * | 7/1913 | Wilkes | ...................... | A01B 1/16 30/165 |
| 1,069,007 A * | 7/1913 | Hauskey | ................. | A01B 1/08 172/381 |
| 1,187,615 A * | 6/1916 | Frees | ....................... | A01B 1/08 172/381 |
| 1,224,957 A | 5/1917 | Robinson | | |
| 1,487,713 A | 3/1924 | Bucher | | |
| 1,549,042 A | 8/1925 | Masters | | |
| 1,554,518 A | 9/1925 | Ostrander | | |
| 2,019,357 A | 10/1935 | Oestreich | | |
| 2,205,769 A * | 6/1940 | Sweetland | ............. | A01K 87/08 16/421 |
| D185,675 S * | 7/1959 | MacMinn | ........................ | D8/80 |
| 3,360,861 A * | 1/1968 | Hoffman | .................. | A61C 3/08 433/3 |
| 3,456,737 A * | 7/1969 | Rhyme | ..................... | A01B 1/24 172/381 |
| 4,177,864 A | 12/1979 | Donnini | | |
| 4,232,422 A * | 11/1980 | Fellmann | ............... | A01B 1/222 16/427 |
| 4,319,642 A * | 3/1982 | Merz | ........................ | A01B 1/16 172/13 |
| 4,467,873 A * | 8/1984 | Kaatz | ...................... | A01B 1/16 172/370 |

(Continued)

*Primary Examiner* — Robert E Pezzuto
*Assistant Examiner* — Joel F. Mitchell
(74) *Attorney, Agent, or Firm* — Brian S. Steinberger; Law Offices of Brian S. Steinberger, P.A.

(57) ABSTRACT

Devices, implements, tools and methods for cleaning undesirable growth and debris from crevices, cracks and spaces in sidewalks, walkways, driveways, and wood decks with a grippable handle having a bent nail type metal rod at one end with a socket having interior threads at an opposite end that can be directly manipulated in one's hand or as an attachment to the end of an elongated handle having a threaded end.

4 Claims, 8 Drawing Sheets

FIG.1B (56) References Cited

U.S. PATENT DOCUMENTS

| | | | |
|---|---|---|---|
| 4,546,831 A | 10/1985 | Albertson | |
| 4,698,019 A * | 10/1987 | Martin | A61C 3/10 |
| | | | 433/144 |
| 4,786,095 A | 11/1988 | Dumont | |
| 4,832,132 A | 5/1989 | Barcelon | |
| 4,934,024 A * | 6/1990 | Sexton | A63B 49/08 |
| | | | 16/421 |
| 5,335,392 A * | 8/1994 | Evans | B44D 3/006 |
| | | | 15/104.001 |
| 5,350,021 A * | 9/1994 | Walker | A01B 1/225 |
| | | | 172/13 |
| D356,409 S * | 3/1995 | Kanaskie | D32/49 |
| 5,439,263 A * | 8/1995 | Chambers | B25B 33/00 |
| | | | 294/26 |
| 5,471,696 A * | 12/1995 | Linfoot | A47L 13/00 |
| | | | 15/104.001 |
| 5,482,338 A * | 1/1996 | Hall | A63B 47/02 |
| | | | 294/19.2 |
| 5,490,374 A | 2/1996 | Calande | |
| 5,579,848 A * | 12/1996 | Hsu | A01B 1/222 |
| | | | 16/422 |
| 5,666,683 A * | 9/1997 | Gairdner | A47L 13/08 |
| | | | 15/104.001 |
| 5,791,708 A * | 8/1998 | Capriotti | E02F 3/02 |
| | | | 172/377 |
| 6,293,349 B1 * | 9/2001 | Marshall et al. | A01G 3/062 |
| | | | 172/123 |
| 6,360,826 B1 | 3/2002 | Barber | |
| 6,470,972 B1 * | 10/2002 | Trampe | A01B 1/16 |
| | | | 172/378 |
| 6,615,928 B2 | 9/2003 | Dueitt | |
| D572,080 S * | 7/2008 | Zemel | D7/395 |

\* cited by examiner

TOOL ATTACHMENT FOR WEED AND DEBRIS REMOVAL

FIELD OF INVENTION

This invention relates to weed and debris removal, and in particular to devices, implements, tools and methods for cleaning undesirable growth and debris from crevices, cracks and spaces in sidewalks, walkways, driveways, and wood decks with a grippable handle having a bent nail type metal rod at one end with a socket having interior threads at an opposite end, wherein the grippable handle can be directly manipulated in one's hand or as an attachment to the end of an elongated handle having a threaded end.

BACKGROUND AND PRIOR ART

Concrete sidewalks and driveways have crevices formed between expansion joints or cracks where undesirable materials, such as but not limited to weeds, grass, plants and debris tend to accumulate. Similarly undesirable material will also accumulate in crevices and cracks between pavers, wood decks and the like, as well in other surfaces that have cracks and spaces The undesirable materials is not clearly not an aesthetic appearance.

Current techniques to remove the undesirable materials requires someone to manually use their fingers to try and pull up the undesirable matter out by hand. However, manually bending down over a long ground stretch takes too much time to be effective, and is physically tiring on the person or persons doing the work.

Using digging tools such as shovels, hoes, rakes and other known tools, such as screw drivers, and the like, are also not easily useable or effective.

Thus, the need exists for solutions to the above problems with the prior art.

SUMMARY OF THE INVENTION

A primary objective of the present invention is to provide devices, implements, tools and methods for cleaning undesirable growth and debris from crevices, cracks and spaces in sidewalks, walkways, driveways, and wood decks that can be directly manipulated by one's hand in close proximity to the undesirable growth and debris material being removed.

A secondary objective of the present invention is to provide devices, implements, tools and methods for cleaning undesirable growth and debris from crevices, cracks and spaces in sidewalks, walkways, driveways, and wood decks that can be used as an attachments to the end of an elongated handle.

The invention tool can be a light weight compact tool used for cleaning cracks and gaps of debris and plant growth. The use of modern high strength materials contributes to the light weight compact design providing exceptional versatility in its use.

The invention is easily carried in a tool pouch or in a workers pocket instantly retrieved for hand held use. When the need arises to clear cracks and gaps which are out of reach, the invention is simply screwed onto a standard broom stick or paint roller handle. In fact when used with an extension handle attached, the cleaning of cracks as found on decks and pavement is accomplished from the standing position instead of working from a sitting or kneeling position.

The invention is useful for cleaning vertical and horizontal cracks and gaps of debris such as loose calk, dirt and plant growth as found on building structures, wood boats, retaining walls, wood decks, brick pavers, concrete pavement etc.

The design of the invention allows for the cleaning and clearing of cracks as narrow as ⅛" yet is perfectly adequate for wide gaps.

The utility of the invention is not limited to the clearing of cracks and gaps, it is also useful for the breaking up of hard compacted soils in restricted areas such as around delicate plantings in gardens.

Following are the specific design features of the invention.

1) The design of the invention is to be used either pole mounted or hand held. The back of the invention can use a common thread form which will accept all common broom sticks or paint roller handles. By simply screwing an extension handle to the grippable handle the user can clean out cracks conveniently from a standing position. However if the user wishes to work from a sitting or kneeling position especially in restricted areas the extension handle is easily removed and can be used as a hand held device.
2) For comfortable hand held use the body of the invention can be designed with sculptured ergonomic/ambidextrous finger grooves. This shape reduces fatigue and improves grip while in use.
3) The hook of the invention can be made of high strength spring steel which provides for high strength and longer life when encountering abrasive surfaces during use. The narrow profile of the hook allows the narrowest of cracks to be cleaned while the shape of the hook gets under and pulls roots and debris from even wide cracks.
4) The body of the invention can be designed to use high strength polymer which reduces weight while maintaining adequate strength to hold both the steel hook and an extension handle which may be optionally attached.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 gripping handle type tool for removing undesirable growth and debris from crevices, gaps and cracks in sidewalks and driveways
20 Paver or sidewalk section or driveway section
30 undesirable growth and debris collected in crevices, gaps and cracks.
40 Solid metal rod cleaning rod.
42 Root end
44 Straight portion
45 single downwardly angled bend
50 Grippable handle body of undesirable growth and debris removal tool.
52 rounded dome shaped front end
54 cylindrical base
60 User.
70 Crevice/gap/crack formed between pavers or sidewalk sections collects weeds and debris.
80 straight tip portion extending from bend of metal cleaning rod with blunt end which extends into crevices, gaps and cracks to remove undesirable growth and debris.
82 blunt end
90 Plurality of circular or oval (inverted dome shaped) indentations formed on bottom of handle for fingers to grip onto
100 Single circular or oval indentation (inverted dome shaped) formed on top of handle for thumb grip, adjacent to front end of grippable handle
110 Female threads in hollow rear end of grippable handle accept threaded end of elongated utility handles
115 hollow inside channel
120 Elongated utility handle with threaded end.
130 Male threads on end of elongated utility handle.

Figure 1A:
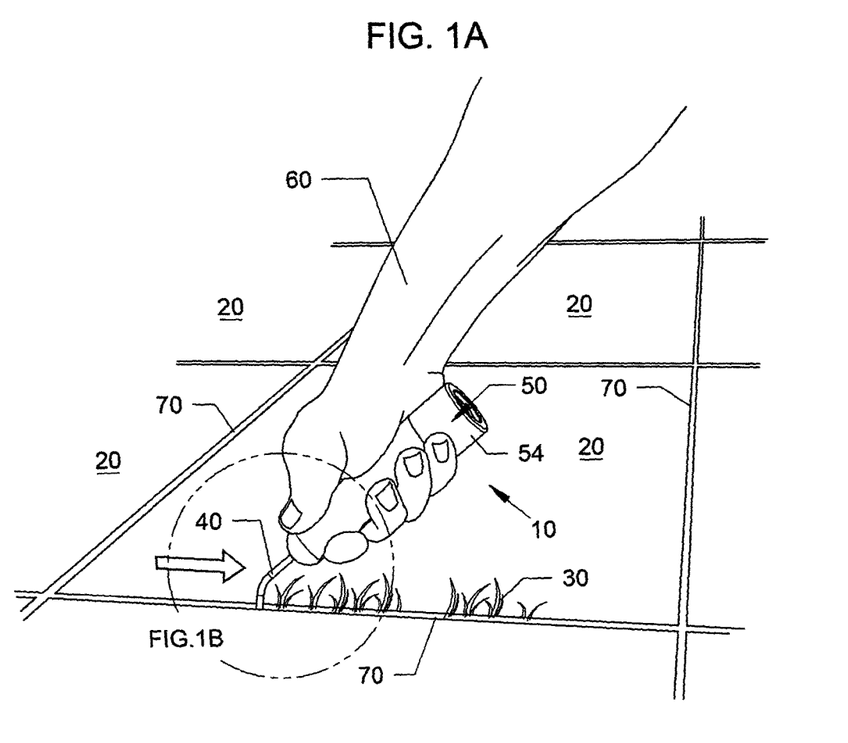
FIG. 1A is a perspective view of the grippable handle device being used to remove undesirable growth and debris material from a paver seam.
Figure 1B:
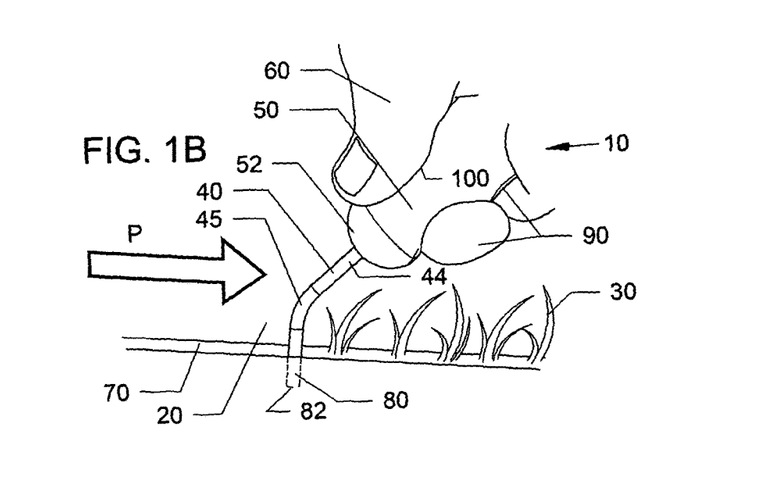
FIG. 1B is an enlarged view of the bent rod and front end of the grippable handle device of FIG. 1A.

FIG. 1A is a perspective view of the grippable handle device 10 being used to remove undesirable growth and debris material 30 from crevices, gaps and cracks 70 between paver(s), on sidewalks and driveways 20, and the like. FIG. 1B is an enlarged view of the bent rod and front end of the grippable handle device 10 of FIG. 1A.

Figure 2:
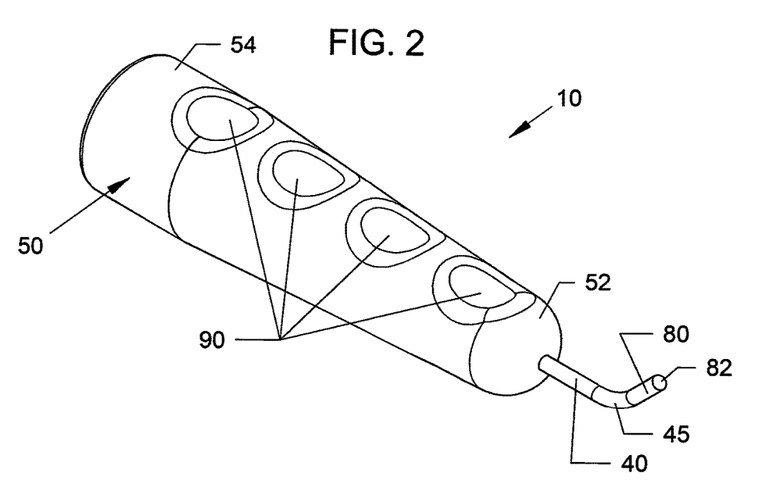
FIG. 2 is a bottom front perspective view of the grippable handle device of FIG. 1.
Figure 3:
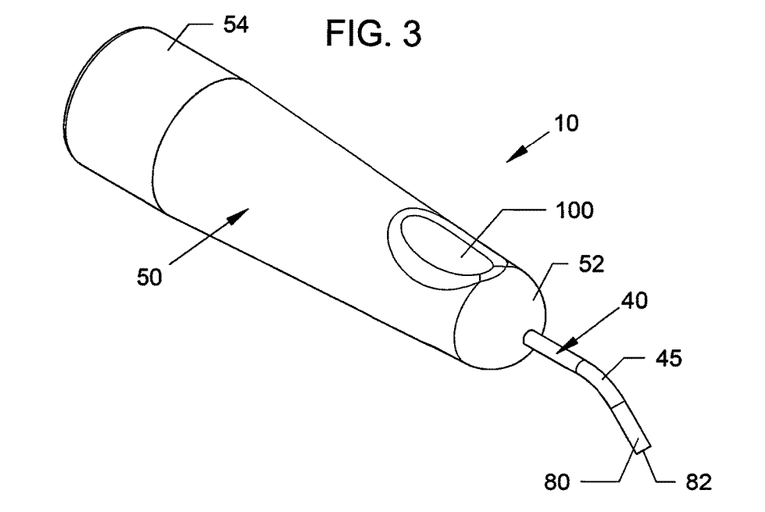
FIG. 3 is a top front perspective view of the grippable handle device of FIG. 1.
Figure 4:
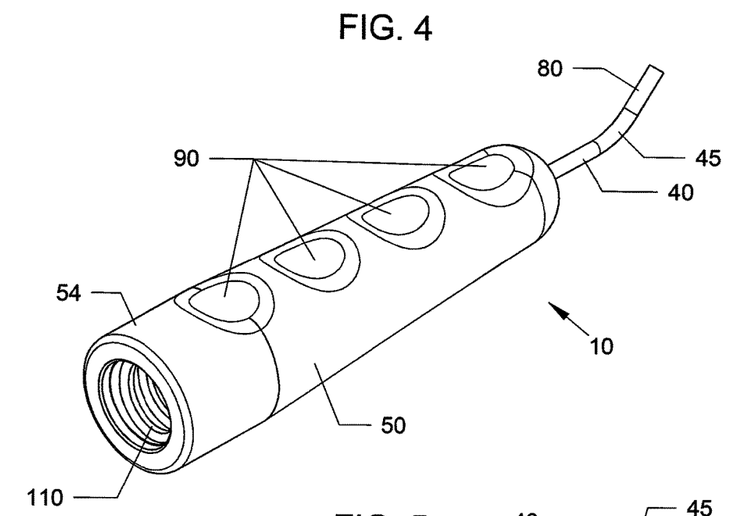
FIG. 4 is a bottom rear perspective view of the grippable handle device of FIG. 3.
Figure 5:
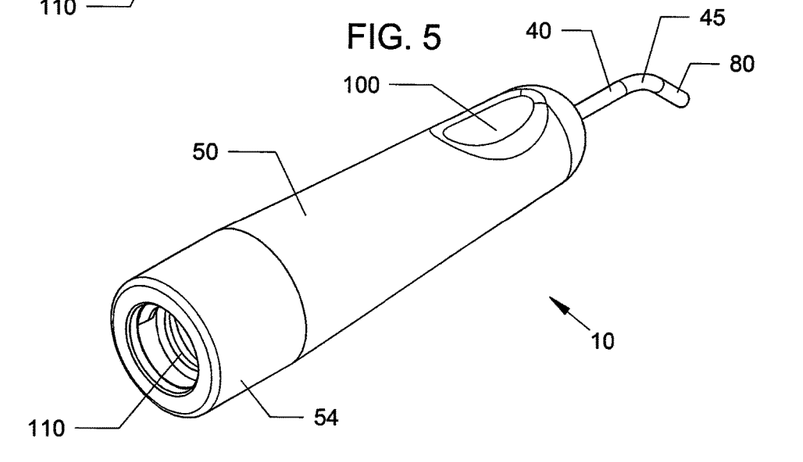
FIG. 5 is a top rear perspective view of the grippable handle device of FIG. 3.
Figure 6:
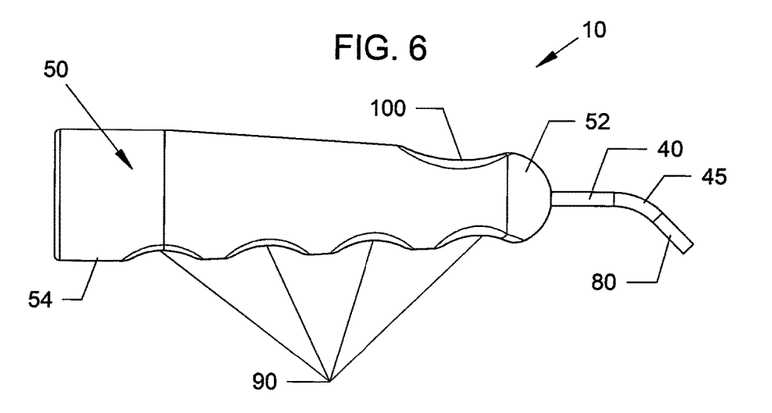
FIG. 6 is a left side view of the grippable handle device of FIG. 3
Figure 7:
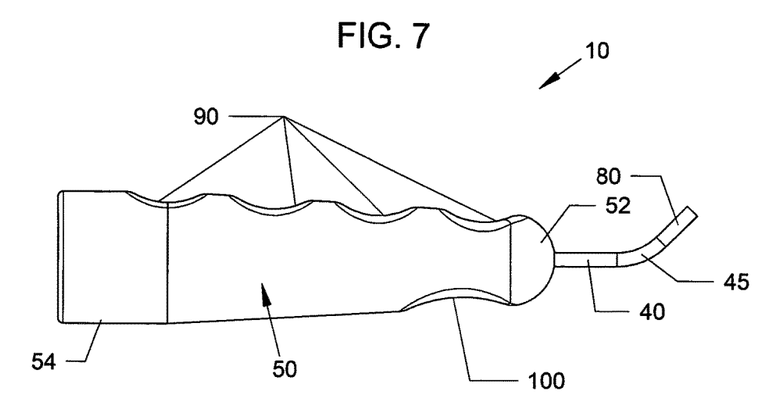
FIG. 7 is a right side view of the grippable handle device of FIG. 4.
Figure 8A:
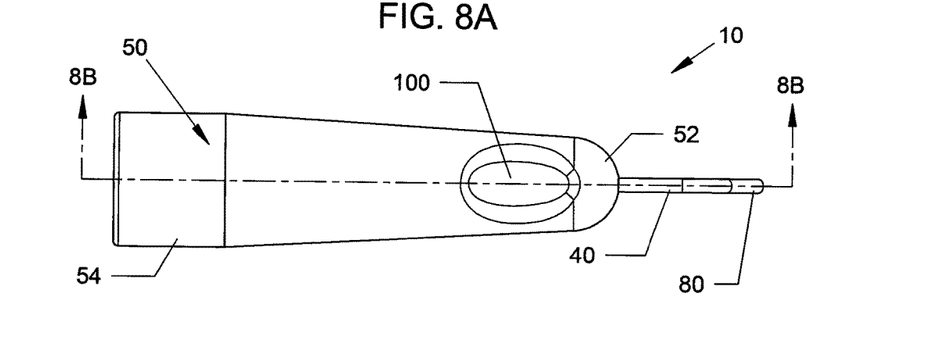
FIG. 8A is a top side view of the grippable handle device of FIG. 3.
Figure 8B:
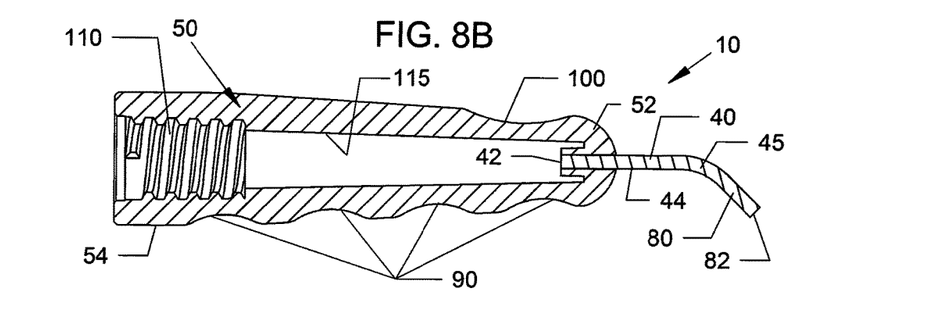
FIG. 8B is a cross-sectional view of the grippable handle device of FIG. 8A along arrows 8B.
Figure 9:
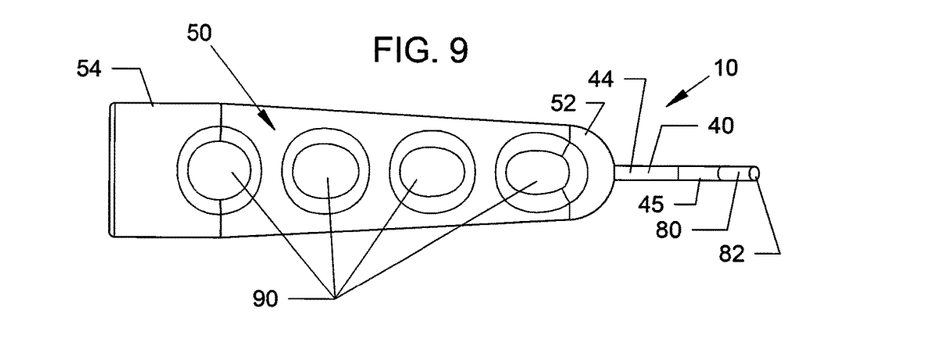
FIG. 9 is a bottom side view of the grippable handle device of FIG. 2.
Figure 10:
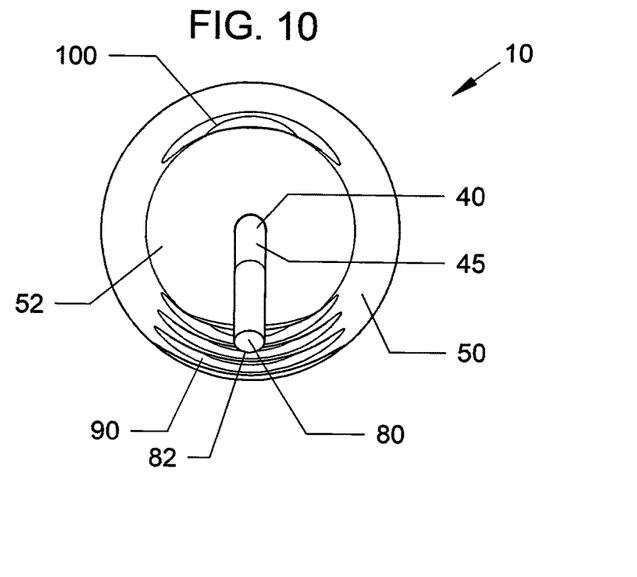
FIG. 10 is a front end view of the grippable handle device of FIG. 3.
Figure 11:
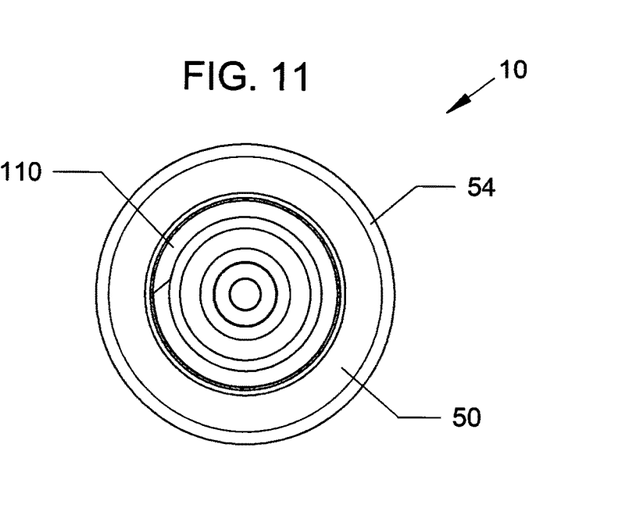
FIG. 11 is a rear end view of the grippable handle device of FIG. 3.

FIG. 2 is a bottom front perspective view of the grippable handle device 10 of FIG. 1. FIG. 3 is a top front perspective view of the grippable handle device 10 of FIG. 1. FIG. 4 is a bottom rear perspective view of the grippable handle device 10 of FIG. 3. FIG. 5 is a top rear perspective view of the grippable handle device 10 of FIG. 3. FIG. 6 is a left side view of the grippable handle device 10 of FIG. 3 FIG. 7 is a right side view of the grippable handle device 10 of FIG. 4. FIG. 8A is a top side view of the grippable handle device 10 of FIG. 3. FIG. 8B is a cross-sectional view of the grippable handle device 10 of FIG. 8A along arrows 8B. FIG. 9 is a bottom side view of the grippable handle device 10 of FIG. 2. FIG. 10 is a front end view of the grippable handle device 10 of FIG. 3. FIG. 11 is a rear end view of the grippable handle device 10 of FIG. 3.

Referring to FIGS. 1-11, the grippable device 10 can have a generally conical shaped body 50 with a larger diameter cylindrical base shaped back end (that can have a diameter of approximately ¾" to approximately 1 and ¼ inches) with socket 110 having internal threads (with running up to approximately 1 inch into the handle body 50), with generally conical sides which taper down to a rounded dome shaped front end 52 (that can have a diameter of approximately ½" to approximately ⅔ of an inch). The conical shape body 50 can have a length of approximately 4 to approximately 6 inches in length. A working embodiment has a length of approximately 4½ inches.

Along a bottom side of the grippable handle 10 can be a plurality of generally inverted dome shaped indentions 90 that can have circular or oval surface shapes, for allowing fingers of a user to grip. A preferred embodiment has four grippable indentations 90 generally equally spaced along the bottom side of the grippable handle 10 for allowing the forefinger, middle finger, fourth finger and pinky tips to grip into.

Along a top side of the grippable handle 10 can be a single circular or oval indentation 100 also having an inverted dome shape, that can be located adjacent the forward end 52 of the grippable handle 10.

A preferred embodiment of the grippable handle 10 can be formed from molded plastic, and the like, as well as composite material, metal, or combinations thereof.

A solid metal rod 40 can be formed from a zinc coated steel, stainless steel, such as the material found in a nail, and can have a generally uniform diameter between a root end 42 and outer tip end 82 being approximately 1/16 of an inch to preferably 1/8 of an inch. Rod 40 has a root end 42 inside of a wall thickened channel 54 of approximately 1/3 of an inch, in the front end 52 of the handle body 50. Root end 42 can be fixed by being pressure fit into the channel 54. Rod 40 can have a straight portion 44 of approximately 1 inch length between the root end 42 and a single bend 45, and another outer straight tip 80 of approximately 1/inch length, with a blunted outer tip end 82.

The solid metal rod 40 is limited to having only a single bend 45, which can have a downwardly bent angle between the top side and bottom side of the grip handle 10 of approximately 15 degrees to approximately 75 degrees, and preferably between approximately 30 and approximately 45 degrees. A preferred embodiment has the single bend being approximately 45 degrees. The blunt end 82 can have a rounded edge, or a sharpened edge, such as a pointed tip edge or partially flattened tip edge.

Referring to FIGS. 1-11, the grippable handle 10 can used as a tool with the fingers of the users gripping into top single indentation 100 preferably with a thumb, and the rest of the hand's four fingers gripping into the bottom indentations 90. The solid bent rod 44 can be angled down so that the blunt tip edge 82 can scrape into crevices, gaps, and cracks 70 formed in sidewalks, driveways, between pavers 20, and the like. The gripping handle 10 can be pulled in the direction of arrow P. Alternatively, the rod 40 can be pushed outward in the direction opposite to arrow P. The grippable handle 10 can be used to clean out and remove undesirable growth 30, such as but not limited to grass, weeds, plants, and the like, as well as debris 30 that collects in the crack type spaces 70.

Figure 12:
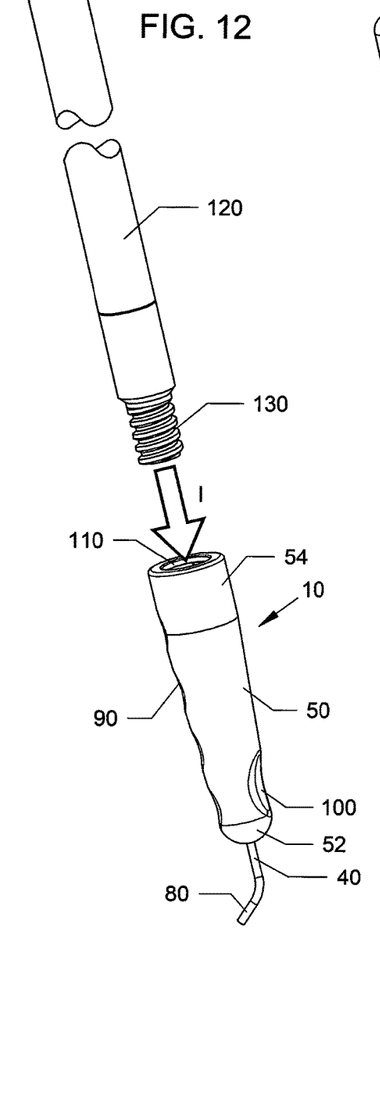
FIG. 12 is a perspective exploded view showing an elongated utility handle with threaded end ready to thread into the threaded socket in the rear end of the grippable handle device of the preceding figures.

FIG. 12 is a perspective exploded view showing an elongated utility handle 120 with threaded end 130 ready to thread into the threaded socket 110 in the rear cylindrical back end 54 of the grippable handle device 10 of the preceding FIGURES. The elongated utility handle 120 can have a diameter of approximately 1 inch and an overall cylindrical length between approximately 3 feet to approximately 4½ feet. The elongated handle 120 can be formed from various materials, such as but not limited to wood, plastic, metal, combinations thereof, and the like.

Figure 13:
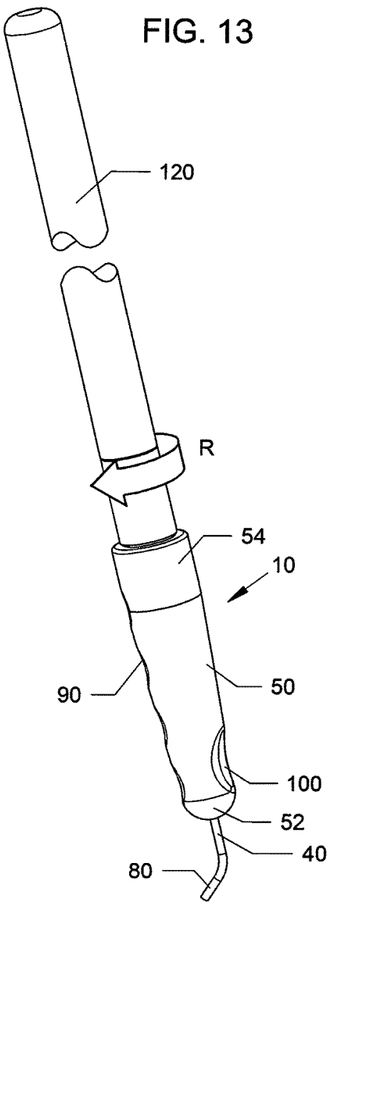
FIG. 13 is an assembled view of the elongated utility handle attached to the grippable handle device shown in FIG. 12.

FIG. 13 is an assembled view of the elongated utility handle 120 attached to the grippable handle device 10 shown in FIG. 12. To assemble, the threaded end 130 can be inserted in the direction of arrow I into and screwed clockwise in the direction of arrow R, into the socket 110 of the cylindrical base 54 of the grippable handle 10

Figure 14:
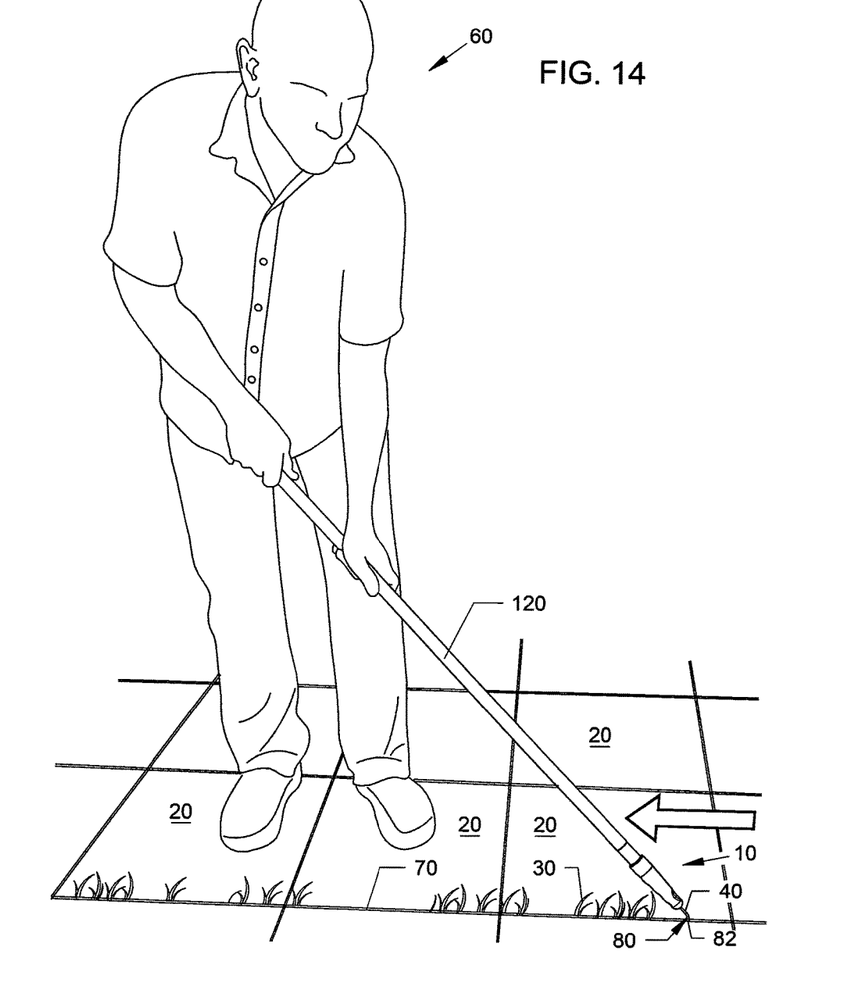
FIG. 14 is a perspective view showing grippable handle with attached elongated utility handle of FIG. 13 being used to remove undesirable growth and debris from crevices formed between pavers in sidewalks and driveways.

FIG. 14 is a perspective view showing grippable handle 10 with attached elongated utility handle 120 of FIG. 13 being used to remove undesirable growth and debris from crevices formed between pavers in sidewalks and driveways. Here, the user 60 can remain in a standing position to scrape and clean out undesirable growth 30 and collected debris 30 in the crevices, gaps, cracks 70 in sidewalks, driveways, wood decks and between pavers, and the like. The cleaning and scraping can be done similar to the pulling and pushing described in reference to FIGS. 1A-1B.

While the solid bent rod 40 is described as being fixed into the front end 52 of the handle body 50, the rods can be held in place by other techniques. For example, a side protruding screw can be used to lock the solid bent rod 40 in place, and allow for different thickness bent rods 40 to be attached to the grippable handle body 50, as well as bent rods 40 with different types of tip edges from sharpened points, blunt tips, flattened tips, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A device for cleaning out and removing undesirable growth and debris from crevices along sidewalks, walkways, driveways and wood decks consisting of:
    a single grip handle consisting of a base end and a rounded dome shaped forward end solely forming a single generally conical shape between the base end and the rounded dome shaped forward end, with a narrowing diameter between the base end and the rounded dome shaped forward end, the grip handle including indentations along the grip handle adapted to assist in gripping the grip handle, the indentations consisting of two to four inverted dome shaped indentations solely located on a bottom side of the grip handle between the base end and the forward end, and consisting of one indentation on a top side of the grip handle directly above one of the two to four identical inverted dome shaped indentations on the bottom side of the grip handle closest to the forward end of the grip handle, the one indentation on the top side of the grip handle being larger than each of the two to four identical inverted dome shaped indentations on the bottom side of the grip handle; and
    a crack cleaning tool consisting of a single cylindrical solid metal rod having a root end and a tip end and a uniform diameter therebetween, the root end passing solely into the rounded dome shaped forward end of the single generally conical shape of the grip handle, the tip end having a blunt tip edge, and a single downward bend relative to the one indentation on the top side of the grip handle, the single downward bend consisting of an angle between approximately 15 degrees and approximately 75 degrees, the single bend being located between the root end and the tip end of the single solid cylindrical metal rod, the uniform diameter of the single solid cylindrical metal rod being substantially smaller than the narrowing diameter of the grip handle, the uniform diameter of the single solid cylindrical metal rod between the root end and the tip end includes a uniform diameter between approximately 1/8 of an inch to approximately 1/16 of an inch, the grip handle having a length of approximately 4 to approximately 6 inches, the base end of the grip handle having a diameter of approximately 1 inch, the grip handle being formed from plastic, the base end of the grip handle includes a hollow socket portion with interior threads; and
    a separate elongated handle having an upper end and a bottom end, the bottom end having external threads for mateably threading into the hollow socket portion in the base end of the grip handle, the separate elongated handle being substantially longer in length than the grip handle, and wherein the device is useful for cleaning out and removing undesirable growth and debris from the crevices along the sidewalks, walkways, driveways and wood decks.

2. The device of claim 1, wherein the single bend is approximately 45 degrees.

3. The device of claim 1, wherein the two to four inverted dome shaped indentations include:

four indentations on the bottom side of the grip handle.

4. The device of claim 1, wherein the single solid cylindrical metal rod includes:

a first straight portion extending from the root end to the single downward bend, and a second straight portion extending from the single downward bend to the blunt tip edge of the tip end.

* * * * *